March 27, 1928. 1,664,265
F. RIEBER
LIQUID GAUGE
Filed July 28, 1924
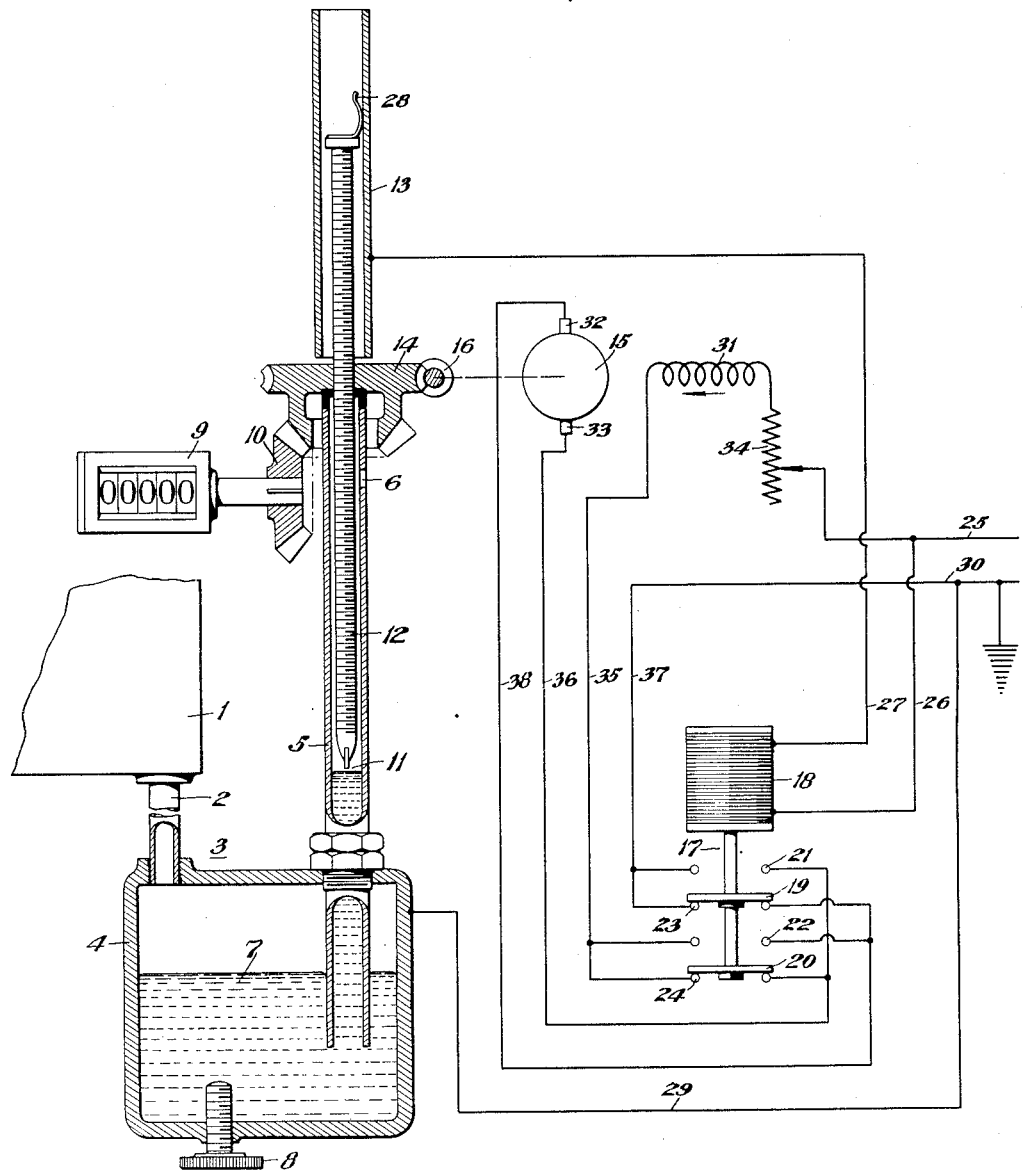

Patented Mar. 27, 1928.

1,664,265

UNITED STATES PATENT OFFICE.

FRANK RIEBER, OF BERKELEY, CALIFORNIA, ASSIGNOR, BY MESNE ASSIGNMENTS, TO PRECISION TANK GAUGE COMPANY, A CORPORATION OF CALIFORNIA.

LIQUID GAUGE.

Application filed July 28, 1924. Serial No. 728,620.

This invention relates to a device for measuring the liquid in a receptacle, and more particularly to such a device that operates by virtue of the pressure exerted by the liquid on a pressure indicating device, such as an open mercury manometer and has for its object the provision of a simple and efficient device of this character.

In carrying out my invention, I provide a contact that is arranged to be moved into and out of the mercury, but in such manner that when readings are taken, the contact is alternately made and broken, the amplitude of the movement being just sufficient to make and break contact. In this manner, the errors arising from the operation of the contact point in the mercury as it is withdrawn and inserted, are compensated. It is thus another object of my invention to provide a hunting contact of this character. In its broadest aspect, this feature of the invention is not confined to any particular scheme of indication or control, since it may be utilized equally favorably in many forms of control systems.

My invention possesses other advantageous features, some of which with the foregoing will be set forth at length in the following description, where I shall outline in full that form of the invention which I have selected for illustration in the drawings accompanying and forming part of the present specification. Although I have shown in the drawings but one form of my invention, I do not desire to be limited thereto, since the invention as defined in the claims may be embodied in many other forms.

Referring to the drawings:

The single figure is a diagrammatic view, showing the manometer mainly in section, although mainly schematically, and the wiring diagram of the system controlling its operation.

I shall describe the invention in connection with the measurement of the quantity of gasoline in large storage tanks, a part of one being shown at 1 in the figure. In order to secure an indication, a conduit or other connection 2 extends from a point at or near the bottom of tank 1 to a pressure responsive device 3, shown in the present instance as a manometer. This conduit 2 may extend a considerable distance from the tank 1, in order to permit indications at a distance. The manometer 3 comprises a bulb or other receptacle 4 into the top of which the conduit 2 passes, and a vertical column or pipe 5 open as at 6 to atmosphere. In case the tank 1 is a closed one, the top of column 5 is put in communication with the top of the tank, in order to take care of the variations in the pressure existing above the liquid in the tank. Column 5 has an open end extending into the mercury 7 which partially fills the bulb 4. As is well understood, the more liquid there is in tank 1, the higher will the mercury extend in column 5, due to the transmission of the static pressure to the level of mercury 7 by the conduit 2. Furthermore, in order to adjust the capacity of the vessel 4 to a value that will bring the level of mercury in pipe 5 to a desired starting point, a screw 8 is provided which extends into the vessel 4.

It is evident that the height of the mercury in column 5 may be used as an indication of the amount of gasoline in tank 1. In order to secure an accurate indication of this level, an indicating device 9 is provided that may be graduated in gallons, and may be in the form of a revolution counter operated by gearing 10. This gearing is so arranged that the indicator 9 is operated in response to variations in the level of the mercury in column 5. In order to secure this effect, a contact tip 11 is arranged to be vertically movable in column 5, and to operate as a follow-up device for the mercury level. In other words, the vertical position of the tip 11 is dependent upon the mercury level by the interposition of electrical circuits to be later described.

To effect these results, the tip 11, which may be made of any suitable metal such as platinum, is carried in the end of a long vertical screw 12. This screw is guided at the top in a guide 13, in such manner that rotation is prevented; but vertical movement is effected by the rotation of a wheel 14 which is in axial threaded engagement with the screw. For example guide 13 may have a non-circular bore within which the spring brush or contact 28 is adapted to slide. This wheel may be rotated in any manner, but in order to accomplish this rotation automatically in response to variations in the mercury level, I use a small electric motor 15. The mechanical drive is effected by making wheel 14 a worm wheel with which the worm 16, rotated by motor 15, meshes.

The gearing 10 is directly operated by wheel 14.

As thus far described, it is evident that the rotation of wheel 14 to raise or lower screw 12 will cause a corresponding operation of the indicator 9. In order to control the motor 15 electrically so as to cause it to operate wheel 14, use is made of the conducting properties of mercury. The circuits are so arranged that when the tip 11 is in contact with the mercury, the motor 15 is caused to rotate in such direction as to withdraw the tip 11 from the mercury. However, as soon as contact is broken, the motor reverses, and acts to reinsert the tip 11.

To provide this hunting action, a reversing switch 17 is electromagnetically operated in response to the variation in the relative position of the contact and the liquid level. In the present instance, I show the switch as including a solenoid, 18, operating two contact discs 19 and 20, which play between upper contact points 21, 22 and lower contact points 23, 24. When the electromagnet 18 is deenergized, as shown, the lower sets of contacts 23, 24, are bridged respectively by the movable contacts 19, 20; but upon energization, the electromagnet pulls up these contacts to bridge the sets 21 and 22. The circuit for electromagnet 18 may be traced as follows:—From the upper main 25 of a source of electric energy, either alternating or direct current, connection 26, coil 18, connection 27 to the guide 13, spring contact 28 carried by screw 12 and contacting with the guide 13, screw 12, tip 11, mercury column 5, vessel 4, and connection 29 back to lower main 30. This circuit is completed only when the tip 11 extends a sufficient distance into the mercury, and is the only circuit that can energize the solenoid 18. The bridging of contacts 23 and 24 causes the motor 15 to operate in a direction to lower screw 12 and thereby to cause contact to be made between tip 11 and the mercury.

This motor in the present instance is shown as a small series commutator motor having a field winding 31, and the reversals in this case are produced by reversing the connections to the armature brushes 32 and 33 while maintaining the field connections intact. The circuit for motor 15 when the lower contacts are bridged, may be traced as follows: from main 25, a variable resistor 34, field winding 31, connection 35, contacts 24, connection 36, lower brush 33, armature of motor 15, upper brush 32, connection 38, lower contacts 23, and connection 37 to the lower main 30. When, however, the operation of this motor continues long enough to cause contact to be made between tip 11 and the mercury, the circuit for solenoid 18 is completed, and the contacts 23 and 24 are opened, while upper contacts 21 and 22 are closed. Under such circumstances the motor is reversed, and operates to withdraw the tip 11, through the following circuit:—From upper main 25, resistor 34, field winding 31, connection 35, upper contacts 22, lead 38, upper brush 32, armature of motor 15, lower brush 33, lead 36, upper contacts 21, lead 37, back to lower main 30.

The speed of the alternate making and breaking of the contacts may be regulated to some extent by varying the resistor 34, which determines the maximum current that can be supplied to the series motor 15. In order to get a reading, the resistor 34 is first reduced to a low value, so as to obtain a rapid rate of operation of the contacts. This will in turn cause the indication to fluctuate rapidly between two values, the mean of which is the true value. Then by throwing in the resistor 34, the alternations can be slowed down for a short time to permit accurate reading.

Although I show the indicator 9 as adjacent the column 5, it is evident that it may be located at any desired central point, the connection thereto from gearing 10 being accomplished either electrically or mechanically. At the central location, any number of indicators may be grouped to indicate the contents of any number of tanks. Similarly, all of the control devices, such as the resistor 34 may be grouped near the indicators, whereby the foregoing method of operation may be expeditiously carried out for all of the indicators.

I claim:

1. In combination, means for holding a column of conducting liquid of variable height, a movable member, indicating means associated with said member, and means for moving the member in accordance with the variations in height of the liquid, comprising a movable contact element arranged to make and break electrical contact with the liquid, at its upper level, and means for moving the contact element alternately toward and from the liquid in response, respectively, to the breaking of electrical contact and to the making of electrical contact between the movable contact element and the liquid.

2. In combination, means for holding a column of conducting liquid of variable height, a movable member, indicating means associated with said member, and means for moving the member in accordance with the variations in height of the liquid, comprising a movable contact element arranged to make and break electrical contact with the liquid, at its upper level, means for moving the contact alternately toward and from the liquid in response, respectively, to the breaking of electrical contact and to the making of electrical contact between the movable contact element and the liquid, and means for varying the rate of making and breaking of the contact element.

3. In a pressure responsive device, means for supporting a column of electrical conducting liquid of variable height, a movable member, indicating means associated with said member, and means for moving the member to an extent dependent upon the variations in height of the column, comprising a movable contact element adapted to make electrical contact with said column, electroresponsive means for moving the contact to keep it substantially at the level of the liquid, and a connection for transmitting motion from the movable contact to the movable member.

4. In a pressure responsive device, means for supporting a column of heavy conducting liquid of variable height, a screw having a contact tip arranged to coact with the upper level of the liquid, indicating means associated with said screw, an electroresponsive means for moving the screw vertically, and means for reversing said electroresponsive means automatically in response to variations in the relative position of the tip with respect to the liquid.

5. In a pressure responsive device, means for supporting a column of heavy conducting liquid of variable height, a vertically movable screw having a contact tip arranged to coact with the upper level of the liquid, indicating means associated with said screw, an electric motor for moving the screw vertically, and an electric circuit controlling the motor and operated by the coaction of the tip and the liquid, said circuit including a reverser for the motor.

6. In a liquid level indicator, a mercury manometer having a column of mercury of variable height, a vertically movable screw having a contact tip arranged to coact with the mercury column, a threaded member adapted to be rotated to move the screw vertically so as to cause the tip to move in or out of the mercury, an indicator operated by said member, an electric motor for rotating the member, an electroresponsive reversing device for the motor, and a circuit for operating the reversing device, said circuit being controlled by the contact tip and the reversing device in such manner that when electrical contact is made between the mercury and said tip, the motor operates to withdraw the tip, and when electrical contact is broken, the motor operates to reinsert the tip.

In testimony whereof, I have hereunto set my hand.

FRANK RIEBER.